Patented Apr. 29, 1952

2,594,294

UNITED STATES PATENT OFFICE 2,594,294

STABILIZATION OF GLYCERIDE OILS WITH IMINODISUCCINIC ACID

John C. Cowan, Peoria, and Cyril D. Evans, Peoria Heights, Ill., assignors to the United States of America as represented by the Secretary of Agriculture No Drawing. Application July 25, 1950, Serial No. 175,851

7 Claims. (Cl. 260—398.5)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the treatment of glyceride oils and such related materials as synthetically produced esters of long chain fatty acids, edible compositions comprising fats of animal or vegetable origin and the like. More particularly, it relates to the treatment of such fatty substances to prevent oxidative deterioration and to increase the storage life and utility of such fatty substances as food materials.

Glyceride oils of animal or vegetable origin are known to deteriorate more or less rapidly upon storage and to develop off-flavors and odors which reduce their utility and value as food materials or as ingredients in pharmaceutical or cosmetic compositions. This deterioration is mainly due to oxidative processes which are extremely difficult to control. Difficulty of control is largely due to the presence of small quantities of metals in the oil which act as catalysts for the auto-oxidation of the oil.

This invention has among its objects the treatment of glyceride oils which contain small quantities of metallic constituents of the class which possesses oxidative catalytic properties, and to remove such metals or to neutralize their catalytic effect, thus increasing the oxidative stability of the oil. We have discovered that glyceride oils, treated with iminodisuccinic acid, possess improved flavor stability under normal storage conditions. Iminodisuccinic acid possesses the chemical property of combining with metal ions usually present in glyceride oils. This phenomenon results in a chemical complex between iminodisuccinic acid and such metals as iron, copper, nickel, cobalt and the like, of such a nature that the metals no longer act as catalysts. The effect of iminodisuccinic acid is particularly pronounced with copper.

Utilizing our discovery, we improve greatly the oxidative stability and the flavor stability of glyceride oils, particularly vegetable oils, such as soybean oil, cottonseed oil, peanut oil, mustard oil, corn oil and the like by adding a stabilizing amount of iminodisuccinic acid thereto. The effect of iminodisuccinic acid is pronounced upon the oil either in the raw state, or as refined by conventional procedure.

The iminodisuccinic acid may be incorporated in the oil simply by addition. The addition may be effected at any desired stage in the conventional treatment of the oil. We have found it convenient to make the addition just prior to the deodorization step in the case of refined oils. The amount added may vary from 0.005 to 0.1 percent by weight.

The following experimental data illustrate the invention.

Samples of soybean oil were treated with iminodisuccinic acid in the amounts shown in Table I. To illustrate the effect of our novel stabilizer, additional control samples were also subjected to the tests as shown in Table I. As a further basis of comparison, samples containing known stabilizers, such as citric acid, were prepared and tested.

A chemical evaluation, known as the modified Swift Stability test, was made, which provides the peroxide values after the samples are blown with air for 8 hours at 208° F. (A. O. M. values). Representative samples of the oil were also evaluated organoleptically. The testing panel was composed of persons skilled in taste testing, and the flavor scores given in the table are based on a 1 to 10 scoring in which the highest score is 10.

Table I

| Oil | Control | | | 0.01% Iminodisuccinic acid | | | 0.1% Iminodisuccinic, A. O. M. | 0.01% Citric acid, A. O. M. |
|---|---|---|---|---|---|---|---|---|
| | A. O. M. | Flavor score | | A. O. M. | Flavor score | | | |
| | | At 0 time | Stored 4 da. at 60° C. | | At 0 time | Stored 4 da. at 60° C. | | |
| Oil No. 1, soybean | 9.6 | | | 2.1 | | | | |
| Oil No. 2, soybean | 21.9 | 9.0 | 6.5 | 3.6 | 9.2 | 7.5 | | |
| Oil No. 3, soybean | 22.5 | 7.9 | 6.8 | 8.9 | 8.4 | 6.5 | | 8.4 |
| Oil No. 4, soybean | 37.4 | | | | | | | |
| Oil No. 4+0.1 p. p. m. Cu | | | | 23.2 | | | 15.0 | |
| Oil No. 4+0.01 p. p. m. Cu | | | | 8.1 | | | | |
| Oil No. 5, soybean | 42.8 | | | | | | | |
| Oil No. 5+0.1 p. p. m. Cu | 98.4 | | | 19.3 | | | | |

We claim:

1. A composition of matter stabilized against oxidative deterioration comprising a glyceride oil having incorporated therein iminodisuccinic acid as a stabilizing agent.

2. A composition of matter stabilized against oxidative deterioration comprising a vegetable glyceride oil having incorporated therein iminodisuccinic acid as a stabilizing agent.

3. A composition of matter stabilized against oxidative deterioration comprising a glyceride oil having incorporated therein iminodisuccinic acid in the amount of about from 0.005 to 0.1 percent based on the weight of the oil as a stabilizing agent.

4. A composition of matter stabilized against oxidative deterioration comprising a glyceride oil containing metallic impurities which possess oxidative catalytic properties having incorporated therein iminodisuccinic acid in the amount of about from 0.005 to 0.1 percent based on the weight of the oil as a stabilizing agent.

5. A process of stabilizing a glyceride oil against oxidative deterioration comprising incorporating iminodisuccinic acid in said oil.

6. A process of stabilizing a glyceride oil against oxidative deterioration comprising incorporating iminodisuccinic acid in the said oil in the amount of about from 0.005 to 0.1 percent based on the weight of the oil.

7. A process of stabilizing a glyceride oil containing metallic impurities which possess oxidative catalytic properties comprising incorporating in said oil iminodisuccinic acid in the amount of about from 0.005 to 0.1 percent based on the weight of the oil.

JOHN C. COWAN.
CYRIL D. EVANS.

REFERENCES CITED

The following references are of record in the file of this patent:

UNITED STATES PATENTS

| Number | Name | Date |
|---|---|---|
| 2,420,122 | Chenicek | May 6, 1947 |